United States Patent [19]
Chan

[11] Patent Number: 5,271,018
[45] Date of Patent: Dec. 14, 1993

[54] METHOD AND APPARATUS FOR MEDIA DEFECT MANAGEMENT AND MEDIA ADDRESSING

[75] Inventor: Litko Chan, San Jose, Calif.

[73] Assignee: NeXT, Inc., Redwood City, Calif.

[21] Appl. No.: 516,456

[22] Filed: Apr. 27, 1990

[51] Int. Cl.$^5$ ............... G11B 20/12; G11B 27/00
[52] U.S. Cl. ................ 371/10.2; 360/48; 360/72.1; 369/32
[58] Field of Search ............ 371/10.1, 10.2, 10.3; 360/48, 49, 53, 72.1; 369/32, 48, 59; 364/268.5, 970.1, 245.3

[56] References Cited

U.S. PATENT DOCUMENTS

| | | | |
|---|---|---|---|
| 3,771,143 | 11/1973 | Taylor | 364/200 |
| 4,434,487 | 2/1984 | Rubinson et al. | 371/10.2 |
| 4,746,998 | 5/1988 | Robinson et al. | 360/72.1 |
| 4,814,903 | 3/1989 | Kulakowski et al. | 360/48 |
| 4,935,825 | 6/1990 | Worrel et al. | 360/54 |
| 4,949,200 | 8/1990 | Weng | 360/72.2 |
| 5,075,804 | 12/1991 | Deyring | 360/49 |
| 5,088,081 | 2/1992 | Farr | 369/54 |
| 5,111,444 | 5/1992 | Fukushima et al. | 369/58 |
| 5,142,515 | 8/1992 | McFerrin et al. | 369/32 |
| 5,146,571 | 9/1992 | Logan | 395/400 |

Primary Examiner—Stephen M. Baker
Attorney, Agent, or Firm—Hecker & Harriman

[57] ABSTRACT

This invention provides a defect management scheme for mass storage devices such as disk drives. The data tracks formed on the surface of the storage media are divided into a plurality of zones. Each zone is divided into a number of logical partitions, with each partition containing a fixed number of sectors. Each partition also includes at least one local spare sector at the end of the partition. Each zone, which may consist of one or more partitions, includes a number of overflow spare sectors at the end of the zone. If there is a defective sector in a partition, the local spare sector is used to replace the defective sector. If there are more defective sectors in a partition than there are local spare sectors, an overflow spare sector is used to replace the additional defective sectors.

15 Claims, 7 Drawing Sheets

METHOD AND APPARATUS FOR MEDIA DEFECT MANAGEMENT AND MEDIA ADDRESSING

BACKGROUND OF THE INVENTION

1. Field of the Invention

This invention relates to the field of mass storage devices and in particular to a method and apparatus for media defect management of a rotating media storage system.

2. Background Art

Mass storage for computer systems may be provided by rotating media storage systems, such as floppy disks, Winchester hard disks or optical disks. In a rotating media storage system, concentric or spiral "tracks" are defined on the surface of the media for storing data. Each track is divided into a number of "sectors" that provide a logical division for storing blocks of data. Each sector represents a number of bits of the data track.

When a recording media is manufactured, such as a magnetic media disk or a magneto optic media disk, tracks and sectors are defined on the disk's surface. The disk is then tested by the manufacturer to determine the validity of each sector. Media defects introduced during the manufacturing process can damage a sector so that data cannot be stored or retrieved from that sector.

Those defective sectors are identified by the manufacturer in a list so that the sectors can be avoided during operation of the disk drive. A list of the bad sectors, known as a "primary defect list" (PDL) or "manufacturers defect list" is stored on the disk media at a location that is reserved on the disk for the list. This reserved location is usually an area on the disk surface outside the boundaries of the data tracks.

When the disk media is placed into service, additional sectors on the disk may become defective. Such defective sectors are known as secondary defects or "grown" defects. A list of grown defects is maintained and stored on a disk surface. This list, known as the "secondary defect list" (SDL), is also stored at a location on the disk surface reserved for that list.

When a disk drive incorporating the disk is powered up, the primary defect list and secondary defect list are read from the disk surface and stored in random access memory (RAM). The disk controller (a microprocessor or other processing means built into the disk drive) uses the information in the PDL and SDL to avoid writing data to bad sectors. In the prior art, the disk controller uses two schemes to avoid and compensate for defective sectors. The first scheme, known as "sector slipping" is used to compensate for manufacturer's defects. The second scheme, known as linear displacement, is used to compensate for grown defects.

SECTOR SLIPPING

Each sector of a disk track is identified by both a logical block address and a physical target address. The logical block address is an address used by an associated host computer system to read data from, and write data to, the disk drive. The physical target address is the actual location on the disk's surface of the logical block, typically identified by track number and sector number.

When a disk drive is formatted, logical block addresses are assigned to each sector. The total capacity of the drive, the number of logical blocks and the size (in bytes) of each logical block are provided to the host. Generally, the logical block addresses are assigned consecutively from a starting point on a disk's surface to an ending point. The host can then operate as if it has a contiguous memory space for storing data.

A translator in the disk controller is used to translate the logical block address information from the host computer to physical target address locations on the disk drive. Correspondingly, physical target address locations on the disk drive are translated to logical block addresses for communication with the host computer.

Sector slipping is a scheme to compensate for defective sectors that result from manufacturer's defects. FIG. 1A illustrates three tracks, each divided into five sectors. When the tracks are initially formatted, twelve logical block addresses (LBA) are consecutively assigned to each sector. Three spare sectors are reserved at the end of the last track for handling defects. FIG. 1B illustrates the logical block address assignment when sector slipping is applied. The five sectors of track 0 are assigned LBA's of 00 through 04, respectively. The first sector of track one, which would have been assigned an LBA of 05, is a manufacturer's defect sector. Therefore, the defective sector is skipped and the next valid sector (sector one of track one) is assigned the next logical block address of 05. The remaining sectors are assigned consecutive LBA's through the third sector of track two where one of the three spare sectors is consumed due to the one defective sector slip. The other two spare sectors are reserved for replacing grown defects. Thus, the number of logical blocks is not affected, but the number of spare sectors is reduced from three to two.

The controller of the disk drive implements a translator to convert the LBA of the host computer to a physical target address. In the example of FIG. 1B, the translation is implemented by dividing the logical block address by the number of sectors per track to provide the track number. For example, the translation for logical block 02 is as follows: the block number 02 is divided by the number of sectors per track, (which is 5), yielding "0" with a remainder of 2. The integer value resulting from the division is the track number of the logical block in question; in this case, track 0. The remainder is the sector number where the logical block is located. In this case, the remainder of 2 means that the physical location is sector 2 of track 0. Referring to FIG. 1B, logical block address 02 is in fact at sector 2 of track 0.

The translation scheme fails for logical block addresses subsequent to a manufacturer's defect sector. For example, when the translation is applied to logical block 6, the result is 1 with a remainder of 1. Therefore, logical block 6 would be identified as sector 1 of track 1. However, because of sector slipping, logical block address 6 is actually at sector 2 of track 1. The prior art utilizes the primary defect list to provide compensation for manufacturer's defects. This compensation is referred to as defect management. After the translation is made, the physical target address is compared to the list of defective sectors in the primary defect list. If there is a defective sector prior or equal to the physical target address given by the translation, the physical target address is increased by the number of such prior defective sectors. In this case, there is one defective sector prior to the location of the translated physical target address. Therefore, by adding 1 to the physical target address, the correct physical target address, track 1 sector 2 is obtained.

LINEAR DISPLACEMENT

Linear displacement is a prior art defect management scheme to compensate for grown defects. When the drive is in operation, another sector, for example, the sector with the logical block address 10 becomes defective, i.e., a grown defect (see FIG. 1C). The logical block address of the defective sector must be reassigned so that the host can write to all of the logical block addresses. Sector slipping can not be performed because the subsequent sectors have data written in them. Because the host computer has identified data in subsequent sectors by their current logical block addresses, changing the logical block addresses of those sectors would result in lost data or misreads. Instead, a linear replacement defect management scheme is utilized.

Logical block address 10 is assigned to one of the spare sectors (track 2, sectors 3 and 4). In a linear replacement scheme, the first sector available is used as the replacement sector, i.e., track 2 sector 3. A list of bad sectors and a pointer to their replacement sectors is kept in the secondary defect list (SDL).

If there are both manufacturer's defects and grown defects, a read or write operation requires three steps: a translation, a search of the PDL for any slip adjustments and a search of the SDL for any sector replacements. For example, if the host computer writes to logical block address 10, a translation is done which identifies that LBA as sector 0 of track 2. The PDL is then reviewed to determine if any slip adjustment is required. In this case, the grown defect sector is subsequent to a manufacturer's defect so a slip adjustment is required. A "1" is added to the physical target address, resulting in a new physical target address of track 2, sector 1. Then the secondary defect list is reviewed. The secondary defect list shows that track 2 sector 1 is a grown defect. It is to be replaced with track 2 sector 3.

A flow diagram illustrating the operation of a prior art disk drive is illustrated in FIG. 2. After the disk drive is powered up at step 10, the primary defect list and secondary defect list are read from the disk surface at step 11. The PDL and SDL are then stored in memory such as a random access memory (RAM) at step 12.

A logical block address (LBA) is received from the associated host computer at step 13. At step 14, the LBA is translated to a physical target address by, for example, dividing the logical block address by the number of sectors per track. At step 15, the physical target address generated by the translation of the LBA is compared to the primary defect list. At step 16, the number of prior defective sectors (defective sector address prior or equal to the physical target address) found in PDL is registered. If such number is zero, the disk drive controller proceeds to step 18. Otherwise, the physical target address is adjusted by adding the number of prior defective sectors at step 17. This adjustment of the physical target address corresponds to the sector slipping scheme of the prior art.

At step 18, the physical target address is compared to the secondary defect list. A decision is made at step 19 to determine whether the physical target address location is at the location of a grown defect. If the physical target address is not at a grown defect location, the disk drive controller proceeds to step 21. If the physical target address is at a grown defect location, the disk drive controller reads the pointer of the secondary defect list to determine the physical target address of the replacement sector of the defective sector at step 20. At step 21, data is read from or written to the new physical target address. The controller then returns to step 13 to receive the next logical block address from the host.

STORAGE OF PDL AND SDL

The disk drive controller in a disk drive is generally a microprocessor. When the disk drive is powered up, the PDL and SDL are read from the disk media and stored in a random access memory for access by the microprocessor. In prior art disk drives, such as magneto optic disk drives, the primary defect list and secondary defect list are stored according to conventions described in the "Proposed American National Standard for Digital Information Interchange 90 Millimeter Optical Disk Data Storage Cartridge," Doc. Number X3B11/88-150-RS.

The addresses of the primary defects are stored in a primary defect list (PDL) illustrated below:

TABLE 1

| Byte Number | Example of Primary Defect List (PDL) Contents |
|---|---|
| 0 | PDL Identifier |
| 1 | PDL Identifier |
| 2 | List Length MSB (4 bytes per entry) |
| 3 | List Length LSB |
| 4 | First Bad Sector Address (track number MSB) |
| 5 | First Bad sector Address (track number) |
| 6 | First Bad Sector Address (track number LSB) |
| 7 | First Bad Sector Address (sector number) |
| . | . |
| . | . |
| n-3 | Nth Bad Sector Address (track number MSB) |
| n-2 | Nth Bad Sector Address (track number) |
| n-1 | Nth Bad Sector Address (track number LSB) |
| n | Nth Bad Sector Address (sector number) |

When a disk drive is initialized, the control processor may detect defective sectors not identified by the primary defect list. These sectors are known as "grown" defective sectors and the addresses of the sectors are stored in a secondary defect list (SDL). An example of an SDL is illustrated below in Table 2.

TABLE 2

| Byte Number | Example of Secondary Defect List (SDL) Contents |
|---|---|
| 0 | SDL Identifier |
| 1 | SDL Identifier |
| 2 | List Length MSB (8 bytes per entry) |
| 3 | List Length LSB |
| 4 | First Bad Sector Address (track number MSB) |
| 5 | First Bad Sector Address (track number |
| 6 | First Bad Sector Address (track number LSB) |
| 7 | First Bad Sector Address (sector number) |
| 8 | First Replacement Sector Address (track number MSB) |
| 9 | First Replacement Sector Address (track number) |
| 10 | First Replacement Sector Address (track number LSB) |
| 11 | First Replacement Sector Address (sector number) |
| . | |
| . | |

In the example of tables 1 and 2, each bad sector detected during manufacturing occupies four bytes in the PDL. Each grown defective sector occupies eight bytes in the SDL. Consider the example of a 500 megabyte Winchester-type hard drive with a defect rate of one sector per megabyte of storage space. At such a defect rate, the example disk drive has 500 bad sectors. If 50 percent of the bad sectors are grown defective sectors, the drive processor requires 3,016 bytes of storage space (RAM) to maintain the PDL (1,004 bytes) and SDL (2,004 bytes).

In magneto optical disk media, the number of defects per megabyte is approximately ten times that of Winchester-type hard disk drives. A 500 megabyte optical disk drive may have up to 5,000 bad sectors. Assuming approximately 50 percent of the defective sectors are grown defective sectors, over 30,000 bytes of RAM space are required to maintain a 10,004 byte PDL and a 20,004 byte SDL. In addition, the time required to search through the two lists of defective sectors is increased which results in a decrease in performance (because of the CPU time required to search the defect lists). The memory requirements are also correspondingly increased.

Therefore, it is an object of the present invention to provide a defect management scheme which reduces the size of the PDL and SDL.

It is another object of the present invention to provide a defect management scheme which requires less memory than prior art schemes for similar storage capacities.

It is yet another object of the present invention to provide a defect management scheme for use with zone bit recorded media.

SUMMARY OF THE INVENTION

This invention provides a defect management scheme for mass storage devices such as disk drives. The data tracks formed on the surface of the storage media are divided into a plurality of zones. In the preferred embodiment of the invention, these zones are coincident with the recording zones of a zones bit recording scheme. Each zone is divided into a number of logical partitions, with each partition containing a fixed number of sectors. Each partition also includes at least one local spare sector at the end of the partition.

Each zone, which may consist of one or more partitions, includes a number of overflow spare sectors at the end of the zone. If there is a defective sector in a partition, the local spare sector is used to replace the defective sector. If there are more defective sectors in a partition than there are local spare sectors, an overflow spare sector is used to replace the additional defective sectors.

This invention utilizes three lists to track defective sectors and the status of each spare sector. The first list is referred to herein as the local spare sector list. Each entry in a local spare sector list contains a one byte value that represents either the status of the local spare sector (the spare sector at the end of each partition) or the logical sector that the spare sector is used to replace. The second list is a bit map where each bit represents a binary status indicating how the local spare sector for each partition is used. The bit position in the bit map addresses each local spare sector. The third list is an overflow spare sector list which tracks the use of overflow sectors when a local spare sector is not available. In a 500 megabyte magneto optical disk, with a one percent defect rate, the management defect scheme of this invention can store all required defective sector information in a table of just over eight kilobytes. Prior art schemes require on the order of 30 kilobytes to store all necessary defective sector information.

BRIEF DESCRIPTION OF THE DRAWINGS

Figures 1A, 1B, 1C:
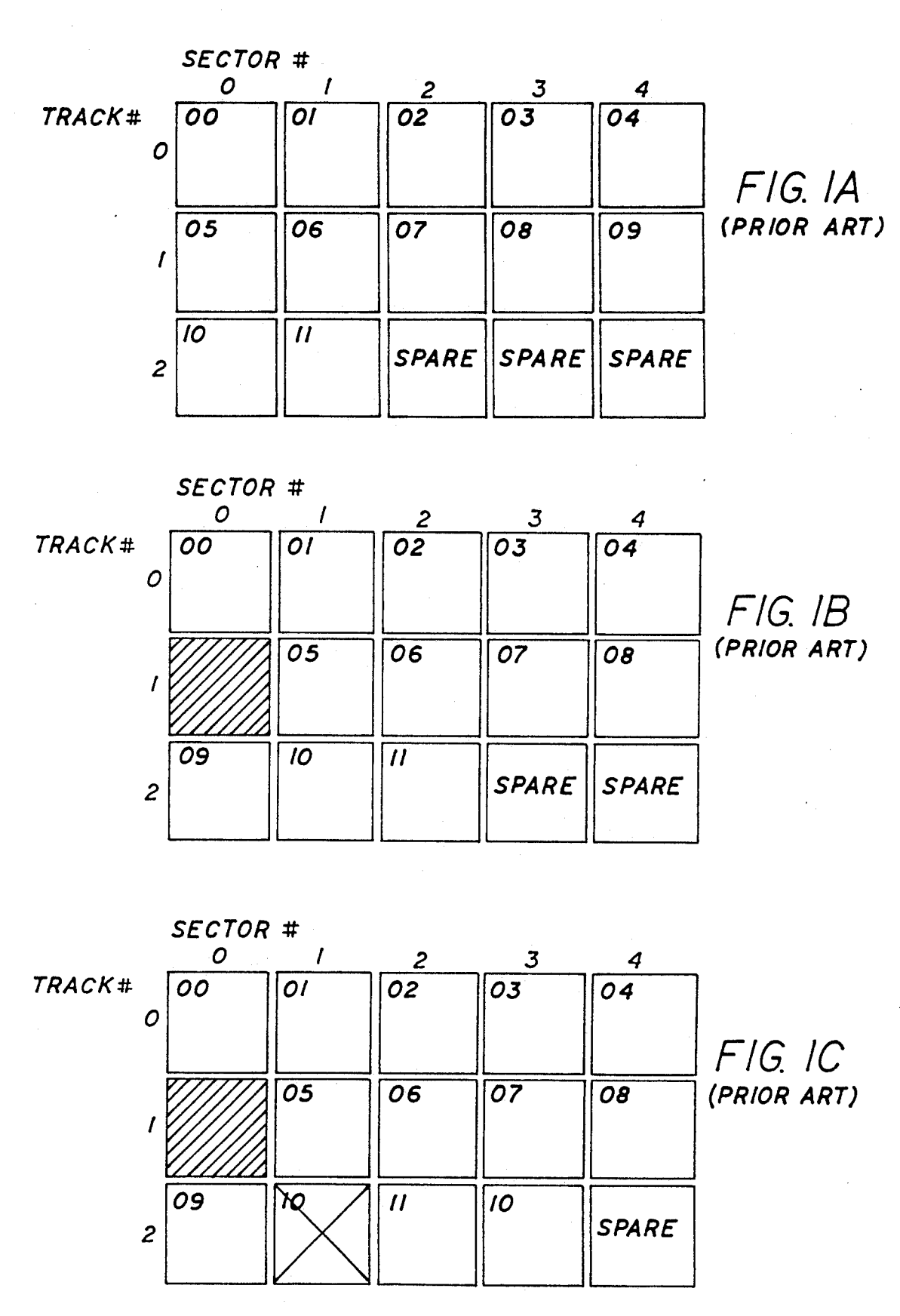

FIG. 1A is a diagram of three recording tracks divided into sectors.

FIG. 1B is a diagram illustrating sector slipping sector replacement scheme.

FIG. 1C is a diagram illustrating a linear displacement sector replacement scheme.

DETAILED DESCRIPTION OF THE INVENTION

This invention relates to a method for defect management in mass storage devices. In the following description, numerous specific details, such as table widths, number of tracks, number of sectors, etc., are described in detail to provide a more thorough description of this invention. It will be apparent, however, to one skilled in the art, that the invention may be practiced without these specific details. In other instances, well known features have not been described in detail so as not to unnecessarily obscure the present invention.

This invention provides a unique addressing and defect management scheme that results in lower memory requirements to manage the same number of defective sectors as prior art defect management schemes. The methods of this invention will be described in connection with a disk drive having a plurality of recording zones. Generally, the number of sectors per track is constant for each track of a disk's surface. However, in one implementation known as "zoned bit recording," several zones of tracks are defined. The frequency at which bits are recorded on tracks in each zone increases with the diameter of the disks so that tracks in the zone near the outer diameter have a greater number of bits than tracks in the zones near the inner diameter. Correspondingly, there are a greater number of sectors in outer diameter tracks than in inner diameter tracks in a zoned bit recording scheme. This invention can be utilized with non-zone bit recording disk drives as well.

Figure 2:
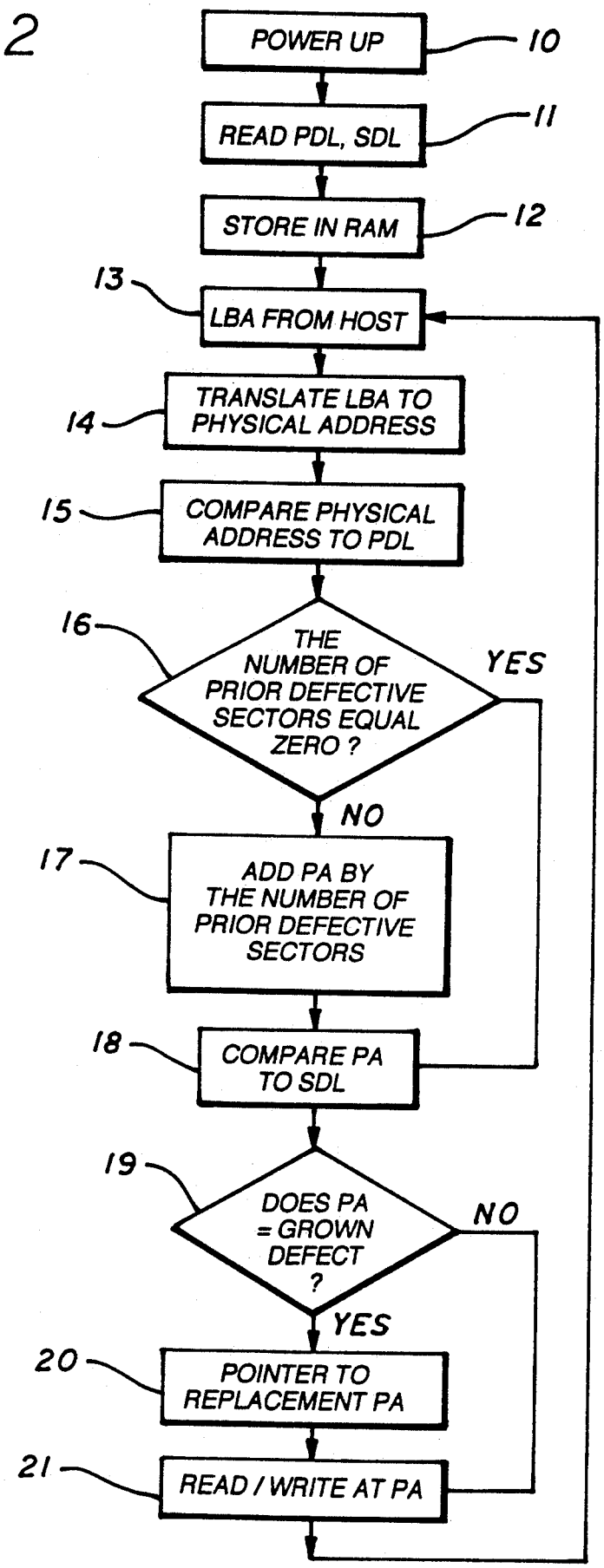
FIG. 2 is a flow diagram of a prior art disk management scheme.
Figure 3:
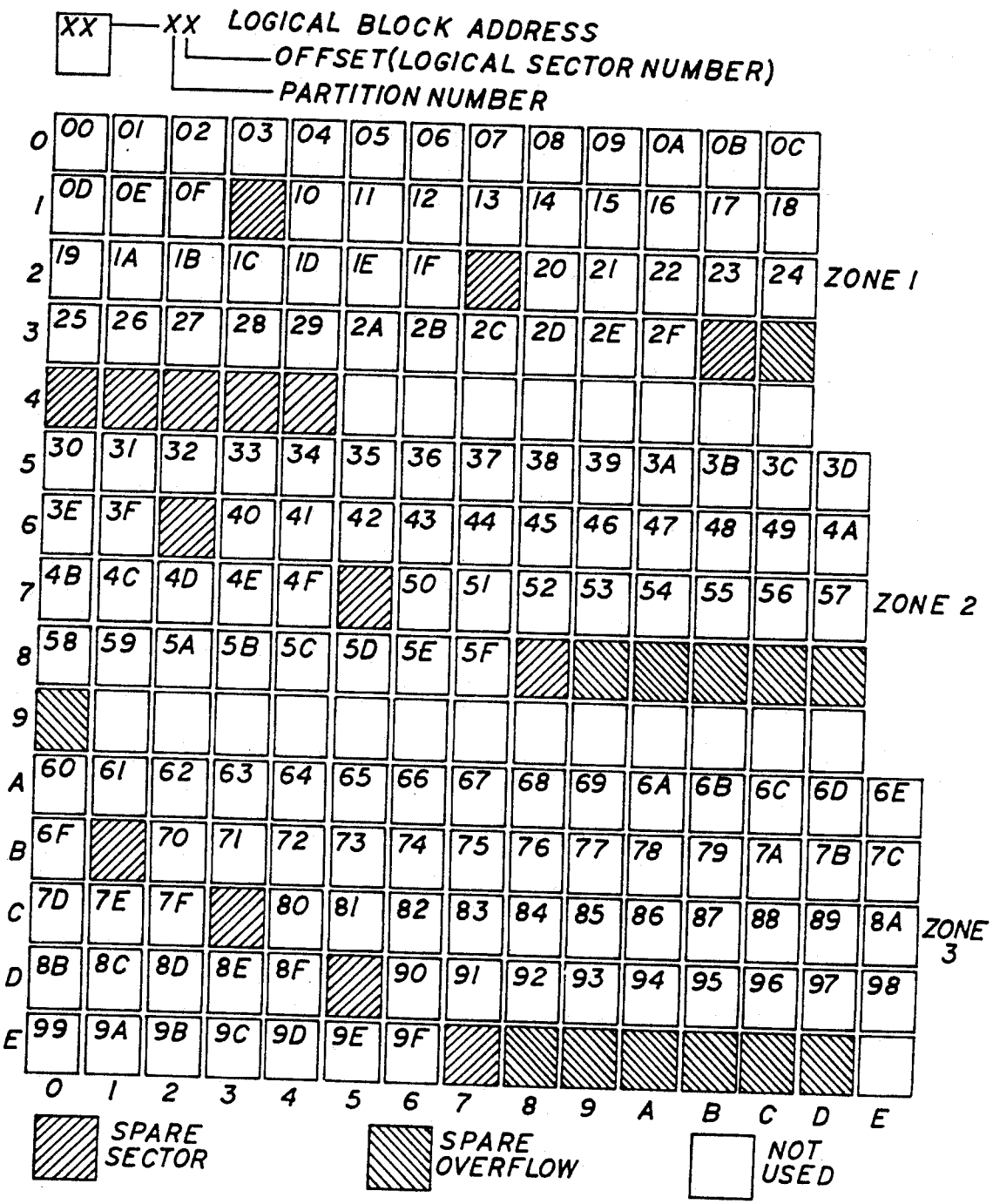
FIG. 3 is a diagram illustrating the partition scheme of this invention.

Referring to FIG. 3, a plurality of recording tracks, each divided into a number of sectors, is illustrated. The recording tracks are grouped into zones as follows: zone 1 consists of tracks 0-4; zone 2 consists of tracks 5-9; and zone 3 consists of tracks A-E. In zone 1, there are 13 sectors per track, in zone 2, 14 sectors per track, and zone 3 has 15 sectors per track.

In this invention, the sectors are grouped into "partitions" where each partition consists of a number of sectors. In the example of FIG. 3, each partition consists of 16 data sectors and one spare sector for a total of 17 sectors per partition. The first partition, partition 0, begins at track 0, block 0 and extends through track 1, block 3. The second partition begins at track 1, sector 4 and continues through track 2, sector 7. The third and final partition of zone 1 begins at track 2, sector 8 and continues through track 3, sector 11. Each partition has at least one local sector at the end of the partition (more than one local spare sector may be used if desired). This spare sector is referred to as the "local spare sector" in this invention. At the end of each zone, a number of spare sectors are allocated and referred to herein as "overflow spare sectors." In the example of FIG. 3, there are six overflow spare sectors per zone. In addition, a number of sectors at the end of a zone may be unused.

As a result of dividing sectors into partitions, a novel addressing scheme can be utilized. The addressing scheme provides important location information to optimize the translation of a logical block address to a physical target address.

Figure 4:
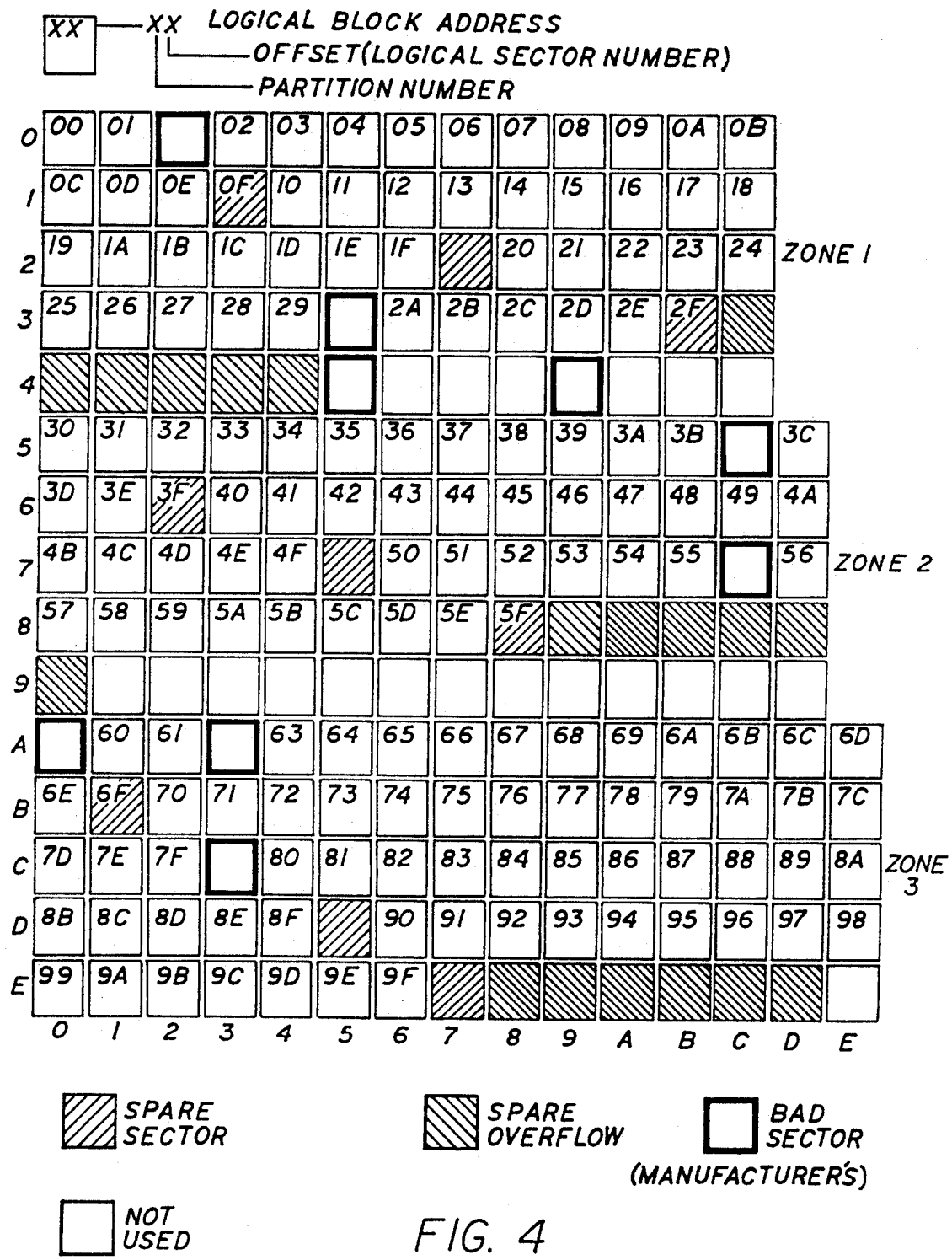
FIG. 4 is a diagram of the tracks of FIG. 3 illustrating manufacturer's defective sectors.
Figure 5:
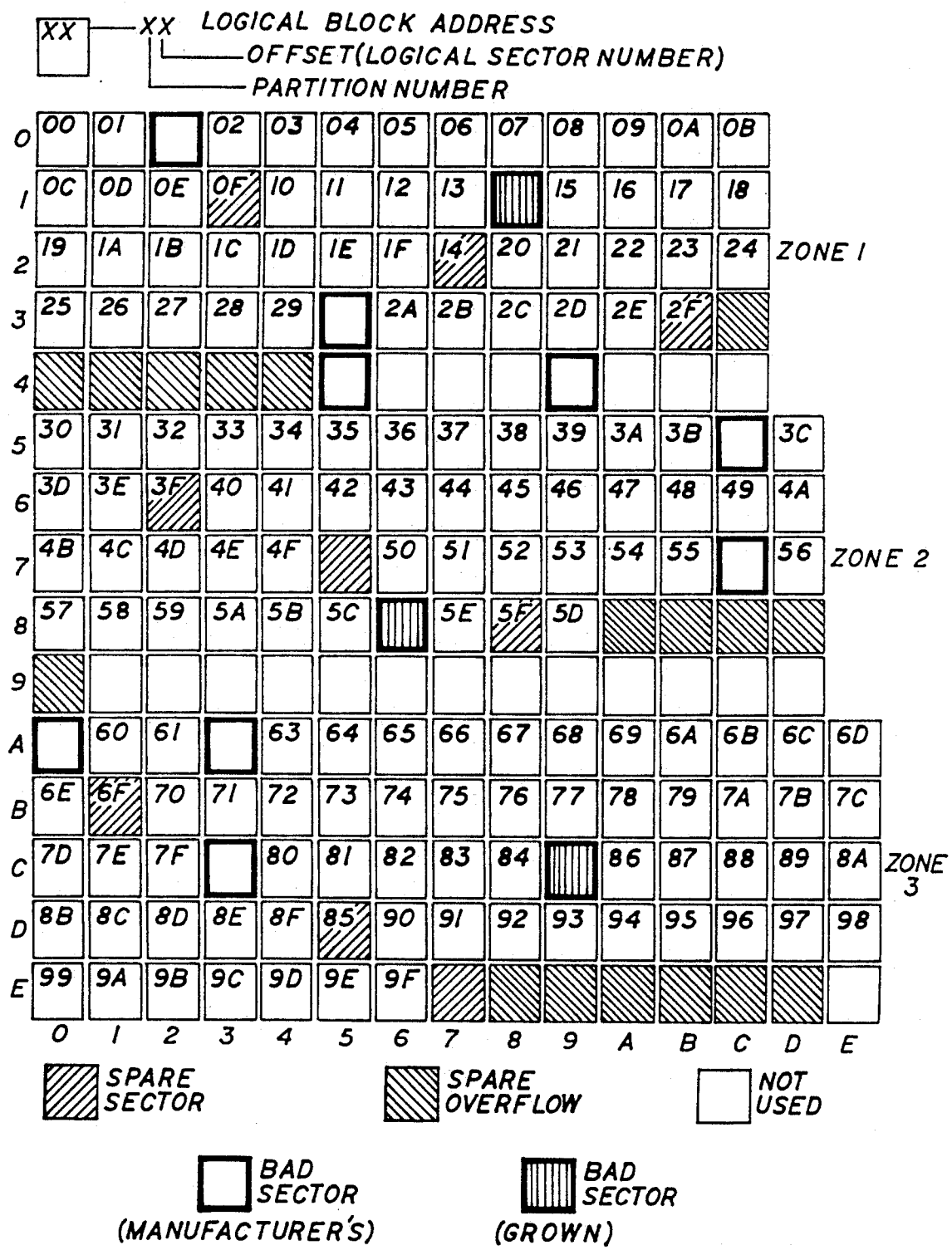
FIG. 5 is a diagram of the tracks of FIG. 4 illustrating grown defective sectors.

The number of partitions to be utilized in this invention is determined by the size (in bits) of the logical block address itself. This invention divides the bits of the LBA into two fields. The first field, containing the most significant bits of the LBA, designates the partition location of the particular LBA. The second field contains the least significant bits of the LBA and represents an offset defining the physical sector location of the LBA in question. In the example of FIGS. 3-5, the logical block is an 8-bit address. The four most significant bits represent the partition number and the four least significant bits represent an offset. The four most significant bits range from 0 to 9 in the example shown, therefore, 10 partitions can be defined for this 8-bit LBA scheme. The four least significant bits have hexidecimal values ranging from 0 to F, so that 16 sectors per partition can be defined.

Referring again to FIG. 3, the local spare sector is used for sector slipping in the case of a manufacturer's defect or for sector reassignment in the case of a grown defect. The overflow spare sectors are used for reassigned sectors when the number of defects is greater than the number of local spare sectors in a partition.

This invention uses three lists to track bad sectors and to track the status of local spare sectors and overflow spare sectors. The lists are the Local Spare Sector List, Bit Map and Overflow Spare Sector List.

LOCAL SPARE SECTOR LIST

Each entry in the local spare sector list contains a 1-byte value representing the status of the local spare sector or the logical sector that the spare sector is used to replace. (The memory size of this value is variable. If the size of the partition is greater than 128, a 2-byte value is used). The value can be:
  80 h; unused, available for sparing;
  81 h : the spare sector is a defective sector;
  0-7 Fh: the logical sector number of the sector that is replaced by sector slipping or reasignment.

BIT MAP

Each bit in the bit map represents a binary status indicating whether the local spare sector is used for sector slipping. The bit position in the bit map determines a local spare sector of a partition. A binary value of "0" indicates that the sector is not used for sector slipping and a binary value of "1" indicates that the local spare sector is used for sector slipping (with the spare sector accommodating the last logical sector within the partition).

OVERFLOW SPARE SECTOR LIST

The Overflow Spare Sector List tracks defective sectors that cannot be handled within its partition because the local spare sector for that partition is not available, either through use of because it is, itself, defective. The entries in the overflow spare sector list are 3 bytes wide in this invention. The Overflow Spare Sector List stores the logical block address originally assigned to the defective sector. A value of 800000 h means the overflow spare sector is unused and a value of C00000 h means the overflow spare sector is itself a defective sector. The initial state for the three lists for the example of FIG. 3 where there are no defective sectors is as follows:

|  | LOCAL SPARE SECTOR LIST | BIT MAP | OVERFLOW SPARE SECTOR LIST |
|---|---|---|---|
| ZONE 1: |  |  |  |
| Partition 0 | 80h | 00000000b | 800000h |
| Partition 1 | 80h | 00000000b | 800000h |
| Partition 2 | 80h |  | 800000h |
|  |  |  | 800000h |
|  |  |  | 800000h |
| ZONE 2: |  |  |  |
| Partition 3 | 80h |  | 800000h |
| Partition 4 | 80h |  | 800000h |
| Partition 5 | 80h |  | 800000h |
|  |  |  | 800000h |
|  |  |  | 800000h |
|  |  |  | 800000h |
| ZONE 3: |  |  |  |
| Partition 6 | 80h |  | 800000h |
| Partition 7 | 80h |  | 800000h |
| Partition 8 | 80h |  | 800000h |
| Partition 9 | 80h |  | 800000h |
|  |  |  | 800000h |
|  |  |  | 800000h |

MANUFACTURER'S DEFECTS

FIG. 4 shows the tracks of FIG. 3 with manufacturer's defects indicated in a number of sectors. The defective sectors of FIG. 4 are located at the following physical locations:

| TRACK NUMBER | SECTOR NUMBER |
|---|---|
| 0 | 2 |
| 3 | 6 |
| 4 | 6 |
| 4 | 9 |
| 5 | C |
| 7 | C |
| A | 0 |
| A | 3 |
| C | 3 |

This invention uses sector slipping within each partition where possible to compensate for a manufacturer's defective sector. In partition 0 for example, track 0, sector 2 is defective. The local spare sector for partition 0 (track 1, sector 3) is available so sector slipping is used. The LBA of each sector in the partition subsequent to the defective sector is decreased by 1. The last LBA in the partition is now assigned to the local spare sector of partition 0.

When there are two or more defective sectors in a partition, sector slipping can only be applied to one of the defective sectors. For example, in partition 6, beginning at track A, sector 0, there are two defective sectors (track A, sector 0 and track A, sector 3). The local spare sector (track B, sector 1) for partition 6 is available to compensate for the first defective sector by using sector slipping. The next defective sector, track A, sector 3 can not be handled by sector slipping because the local spare sector is already used (as a result of the prior defective sector in the partition). Therefore, the defective sector must be replaced with an overflow spare sector from the end of the zone containing this partition. When a replacement sector is needed, the first available overflow spare sector is used. In this case, the first available overflow sector of the zone is track E, sector 8. This sector is assigned logical block address 62 (partition 6, logical sector 2).

The primary defect list of manufacturer's defective sectors is stored in a reserved area of the disk media. When a disk drive is initialized, and prior to assigning logical block addresses, the disk drive processor reads the PDL from the disk surface and updates the local spare sector list and overflow spare sector list. Referring to FIG. 4, the local spare sector for partition 7 (track C, sector 3) is defective. All other local spare sectors and overflow spare sectors are valid. Therefore, the local spare sector list and overflow spare sector list are updated as follows:

|  | LOCAL SPARE SECTOR LIST | BIT MAP | OVERFLOW SPARE SECTOR LIST |
|---|---|---|---|
| ZONE 1: |  |  |  |
| Partition 0 | 80h | 00000000b | 800000h |
| Partition 1 | 80h | 00000000b | 800000h |
| Partition 2 | 80h |  | 800000h |
|  |  |  | 800000h |
|  |  |  | 800000h |
| ZONE 2: |  |  |  |
| Partition 3 | 80h |  | 800000h |
| Partition 4 | 80h |  | 800000h |
| Partition 5 | 80h |  | 800000h |
|  |  |  | 800000h |
|  |  |  | 800000h |
|  |  |  | 800000h |
| ZONE 3: |  |  |  |
| Partition 6 | 80h |  | 800000h |
| Partition 7 | 81h |  | 800000h |
| Partition 8 | 80h |  | 800000h |
| Partition 9 | 80h |  | 800000h |
|  |  |  | 800000h |
|  |  |  | 800000h |

After the local block addresses have been assigned, sector slipping has been applied and sector replacement has been implemented where required, the Local Spare Sector List, Bit Map and Overflow Spare Sector List are updated as follows:

|  | LOCAL SPARE SECTOR LIST | BIT MAP | OVERFLOW SPARE SECTOR LIST |
|---|---|---|---|
| ZONE 1: |  |  |  |
| Partition 0 | 02h | 01101101b | 800000h |
| Partition 1 | 80h | 00000000b | 800000h |
| Partition 2 | 0Ah |  | 800000h |
|  |  |  | 800000h |
|  |  |  | 800000h |
| ZONE 2: |  |  |  |
| Partition 3 | 0Ch |  | 800000h |
| Partition 4 | 80h |  | 800000h |
| Partition 5 | 06h |  | 800000h |
|  |  |  | 800000h |

|  | LOCAL SPARE SECTOR LIST | BIT MAP | OVERFLOW SPARE SECTOR LIST |
|---|---|---|---|
|  |  |  | 800000h |
|  |  |  | 800000h |
| ZONE 3: |  |  |  |
| Partition 6 | 00h |  | 000062h |
| Partition 7 | 81h |  | 800000h |
| Partition 8 | 80h |  | 800000h |
| Partition 9 | 80h |  | 800000h |
|  |  |  | 800000h |
|  |  |  | 800000h |

The Local Spare Sector List contains the logical sector number of the sector of the relative partition which has been replaced by sector slipping or reassignment. For partition 0, the Local Spare Sector List stores a value of "02 h." Referring to FIG. 4, we see that in partition 0, logical sector 2 is defective and has been replaced by sector slipping. Similarly, in partition 2, logical sector A is defective and has been replaced through sector slipping. Therefore, the Local Spare Sector List contains a value of "0 Ah" in the Local Spare Sector List for partition 2. The local spare sector of partition 7 is defective. Therefore, the Local Spare Sector List contains a value of 81 h for partition 7 indicating that the spare sector is defective.

The Bit Map is also updated to reflect the status of the local spare sectors. In a Bit Map, the least significant bit of the first row corresponds to the spare sector for partition 0, with each succeeding bit position corresponding to the next succeeding partition. The most significant bit of the first row corresponds to the spare sector for partition 7. The least significant bit of row 2 of the Bit Map corresponds to partition 8 and the second least significant bit corresponds to partition 9. The Bit Map indicates whether the local spare sector for a particular partition is used for sector slipping.

In the preferred embodiment of this invention, a logical 0 indicates that the local spare sector is not used for sector slipping and a logical 1 indicates that the local spare sector is used for sector slipping. This convention can be reversed without departing from the scope of the present invention. The least significant bit of the first row of the Bit Map is a logical 1 indicating that the local spare sector for partition 0 is used for sector slipping. The next least significant bit is a logical 0 indicating that the local spare sector for partition 1 is not used for sector slipping. The local spare sectors are used for sector slipping in partitions 2, 3, 5 and 6.

The local spare sector for partition 7 is defective. Therefore, the local spare sector is not used for sector slipping and so the most significant bit of the first row of the bit map has a value of logical 0.

The Overflow Spare Sector List tracks the status of the overflow spare sectors. After sector slipping and block reassignment, only one overflow spare sector has been used in the example of FIG. 4. An overflow spare sector was used to replace a block in partition 6, (track A, sector 3). The overflow spare sector list stores the logical block address originally assigned to the sector which is being replaced. In this case, the first overflow spare sector of zone 3 is assigned a value of "000062 h."

GROWN DEFECTS

After the disk media is in operation, a sector may become defective. Such a defective sector is referred to as a "grown defect." The defective sector is replaced with a space sector by reassigning. Sector slipping can not be applied to grown defects because the logical block addresses have already been assigned.

FIG. 5 is a diagram of the tracks of FIGS. 3 and 4 illustrating grown defects at logical block 14h (track 1, sector 8), logical block address 5dh (track 8, sector 6) and logical block address 85h (track C, sector 9).

Logical block address 14—Logical block address 14h is logical sector 4 in partition 1. A review of the Local Spare Sector List for partition 1 indicates that that sector is available (track 2, sector 7). The local spare sector is used to replace the defective sector. The Local Spare Sector List is updated so the local spare sector for partition 1 indicates logical sector 4. The Bit Map is not affected because the local spare sector, although used, is not used for sector slipping. The Bit Map indicates only sector slipping.

Logical block address 5dh—Logical sector D of partition 5 (track 8, sector 6) cannot be replaced with the local spare sector because the Local Spare Sector List indicates that the local spare sector for partition 5 is used to replace logical sector 6 (track 7, sector C). Thus, the first available overflow spare sector for zone 3 (which contains partition 5) is used to replace the grown defective sector. In this case, the first available overflow spare sector is track 8, sector 9. The Overflow Spare Sector List for zone 2 is updated and the logical block address of the sector being replaced is entered in the Overflow Spare Sector List (i.e., 00005Dh). The Local Spare Sector List and Bit Map are not affected.

Logical block address 85h—The local spare sector for partition 8 is available so it is assigned the logical block address of the grown defective sector. The Local Spare Sector List is updated so that the local spare sector for partition 8 is assigned a value of 05 h. The Bit Map and Overflow Spare Sector List are not affected. The Local Spare Sector List, Bit Map and Overflow Spare Sector List now read as follows:

|  | LOCAL SPARE SECTOR LIST | BIT MAP | OVERFLOW SPARE SECTOR LIST |
|---|---|---|---|
| ZONE 1: |  |  |  |
| Partition 0 | 02h | 01101101b | 800000h |
| Partition 1 | 04h | 00000000b | 800000h |
| Partition 2 | 0Ah |  | 800000h |
|  |  |  | 800000h |
|  |  |  | 800000h |
| ZONE 2: |  |  |  |
| Partition 3 | 0Ch |  | 00005Dh |
| Partition 4 | 80h |  | 800000h |
| Partition 5 | 06h |  | 800000h |
|  |  |  | 800000h |
|  |  |  | 800000h |
|  |  |  | 800000h |
| ZONE 3: |  |  |  |
| Partition 6 | 00h |  | 000062h |
| Partition 7 | 81h |  | 800000h |
| Partition 8 | 05h |  | 800000h |
| Partition 9 | 80h |  | 800000h |
|  |  |  | 800000h |
|  |  |  | 800000h |

LOGICAL BLOCK ADDRESS TO PHYSICAL ADDRESS TRANSLATION

The invention uses a zone table as part of the translation process. Each entry in the zone table consists of five fields. The first field is a 24-bit field and contains the logical block address of the first block in each zone. For the example disk of FIGS. 3-5, there are three zones and therefore three entries in the zone table. The first field of zone 1 has an entry of 000000h, the logical block address of the first block in zone 1. The first field of the zone 2 entry has a value of 000030, the logical block address of the first block of zone 2, and the first field of the zone 3 entry has a value of 000060, the logical block address of the first block of zone 3.

The second field of each zone table entry contains the first track number in each zone and contains entries for track 0, track 5 and track A for zones 1, 2 and 3, respectively. The third field is a 16-bit field indicating the number of partitions contained in the particular zone. Zones 1 and 2 each contain three partitions and zone 3 contains four partitions.

The fourth field of each zone table entry indicates the number of sectors per track in each zone (13 sectors per track in zone 1, 14 sectors per track in zone 2, and 15 in zone 3). The fifth and last field in the zone table contains the physical target address of the first overflow spare sector in the zone. Therefore, the fifth field contains both a track portion and a sector portion. The first overflow spare sector of zone 1 is track 3, sector C. The first overflow spare sector of zone 2 is track 8, sector 9 and the first overflow spare sector of zone 3 is track E, sector 8.

In the example of FIGS. 3-5, the zone table is as follows:

| ZONE NO. | FIELD 1 | FIELD 2 | FIELD 3 | FIELD 4 | FIELD 5 |
|---|---|---|---|---|---|
| 1 | 000000h | 0000h | 0003h | 0Dh | 0003h 0Ch |
| 2 | 000030h | 0005h | 0003h | 0Eh | 0008h 09h |
| 3 | 000060h | 000Ah | 0004h | 0Fh | 000Eh 08h |

After determining which zone contains the target sector by comparing field 1 in the zone table with the logical block address. The target track number and target sector number are calculated by the following equations:

$$\text{Target Track Number} = \frac{\text{Target } LBA - \text{Field 1}}{\text{Field 4}} + \text{Field 2} \quad \text{(Equation 1)}$$

$$\text{Target Track Number} = \text{Remainder}\left(\frac{\text{Target } LBA - \text{Field 1}}{\text{Field 4}}\right) \quad \text{(Equation 2)}$$

Figure 6:
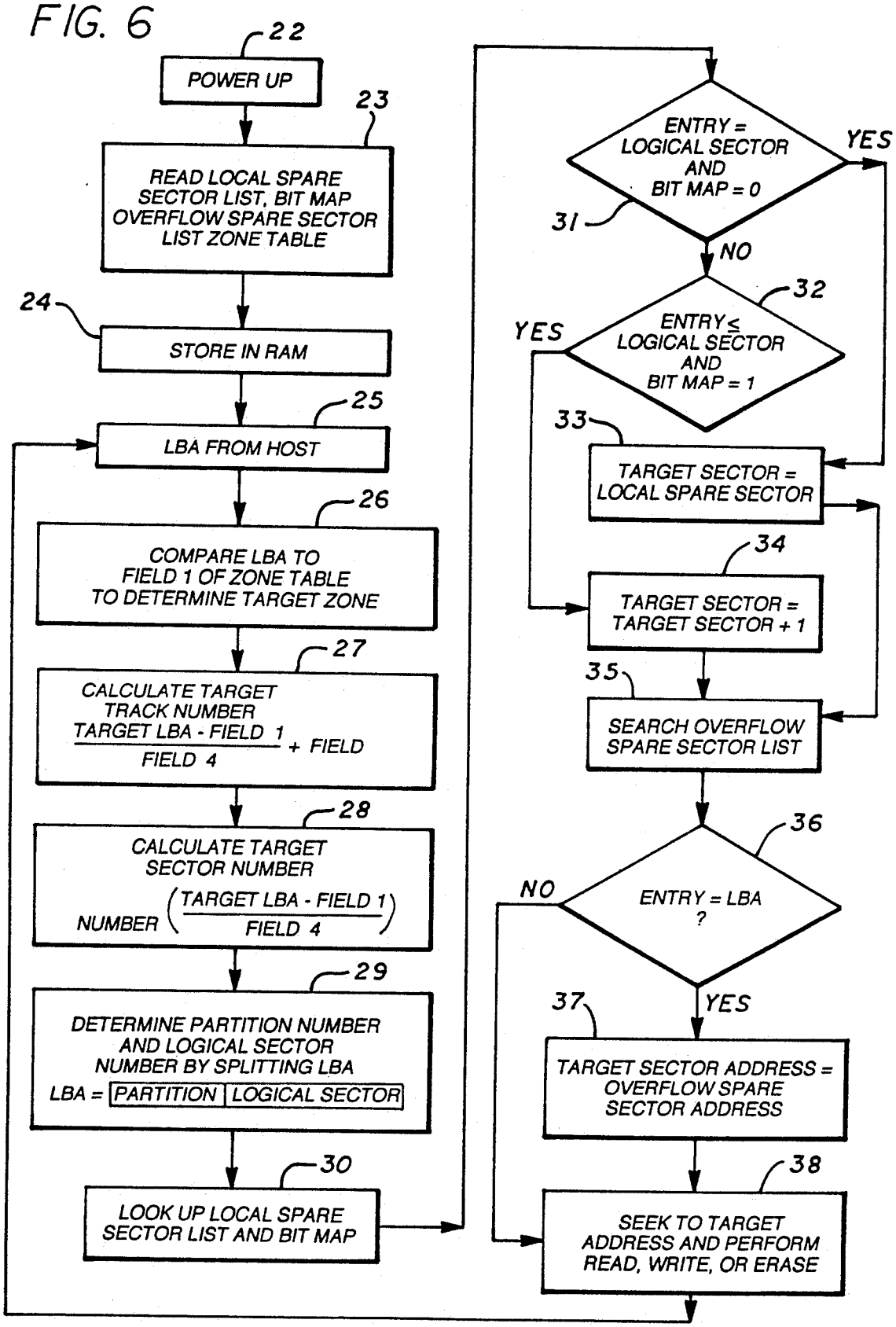
FIG. 6 is a flow diagram of the defect management scheme of this invention.

A flow diagram of the operation of the invention is illustrated in FIG. 6. At step 22, the disk drive is powered up. At step 23, the Local Spare Sector List, Bit Map, Overflow Spare Sector List and Zone Table are read from a reserved area on the disk surface. The lists are then stored in RAM at step 24.

At step 25, a logical block address is received from the host computer. The LBA is compared to field 1 of the zone table to determine the target zone at step 26. After the target zone is determined, the target track is calculated utilizing equation 1 at step 27. At step 28, the target sector number is calculated using equation 2. After the target track and target sector have been calculated, the LBA is split to determine the partition number and logical sector number at step 29.

At step 30, the Local Spare Sector List and Bit Map for the relevant partition are compared to the LBA. At step 31, a decision is made as to whether the Local Spare Sector List entry equals the logical sector and the Bit Map entry is 0. If both conditions are met, the process proceeds to step 33 and the target sector is equal to the local spare sector.

If the conditions at decision block 31 are not met, the process proceeds to decision block 32. If the Local Spare Sector List entry is less than or equal to the logical sector and the Bit Map entry is 1, the process proceeds to step 34. At step 34, the target sector calculated at step 28 is adjusted so that the target sector equals the calculated target sector plus one. Steps 33 and 34 both proceed to step 35 and a review of the Overflow Spare Sector List for the portion associated with the target zone is compared to the LBA. At decision block 36, if the Overflow Spare Sector List entry is equal to the LBA, the target sector address is equal to the overflow spare sector address at step 37. If the condition at decision block 36 is not satisfied, the process proceeds to step 38. At step 38, a seek is performed to the target address and a read, write or erase is performed. After step 38, the process returns to step 25 to receive a new LBA from the host computer.

The operation of the invention can be illustrated by the following two examples.

EXAMPLE 1

In the first example, a logical block address of 07 is provided by the host at step 25. A comparison of the LBA to field 1 of the zone table at step 26 shows that the LBA is greater than the entry in field 1 for zone 1 but less than the entry in field 1 of zone 2. Therefore, the logical block address is found in zone 1.

At step 27, a target track number is calculated using equation 1 as follows:

$$\frac{\text{Target } LBA - \text{Field } 1}{\text{Field } 4} + \text{Field } 2$$

Substituting in:

$$\frac{07 - 00}{14} + 00$$

The target track is the integer portion of the solution to this equation which in this case is 0. Therefore, the target track is track 0.

At step 28, a target sector is calculated. The target sector is the remainder of the target LBA minus Field 1 divided by field 4. In this case, the remainder is 7, so the target sector is sector 7 of track 0.

At step 29, the LBA is split to determine the partition number and logical sector. In this case, the partition number is 0 and the logical sector is 7. The Local Spare Sector List and Bit Map entry for partition 0 are reviewed and a comparison done at step 31. In this case, the comparison of step 31 is not met because the entry of the Local Spare Sector List is not equal to the logical sector. Proceeding to decision block 32, this decision block is satisfied because the entry of the Local Spare Sector List for partition, 02, is less than or equal to the logical sector, 07 and the Bit Map value for partition 0 is equal to 1. Therefore, proceeding to step 34, the target sector is equal to the target sector plus 1 or sector 08.

At step 35, the Overflow Spare Sector List for partition 0 is compared to the logical block address. At step 36, the decision is not satisfied because the entry of the Overflow Spare Sector List is not equal to the LBA. Therefore, proceeding to step 38, a seek is made to track 0 (calculated at step 27) and sector 8 (determined at step 34). Referring briefly to FIG. 5, track 0 sector 8 is, in fact, logical block 07.

EXAMPLE 2

In example 2, a logical block address of 62 is received from the host at step 25. At step 26, the logical block address is compared to field 1 of the zone table to determine the target zone. The logical block address 62 is greater than the entry of 60 in field 1 of zone 3. Therefore, logical block address 62 is contained in zone 3.

At step 27, the target track is calculated:

$$\frac{62 - 60}{0F} + 0A = \text{Track } A$$

At step 28, the target sector is calculated:

$$\frac{62 - 60}{0F} \text{ is } = 0 \text{ with remainder of } 2,$$

so the target sector is sector 2.

At step 29, the LBA is split to determine the partition number and sector number. The partition number is 6 and the logical sector number is 2. The Local Spare Sector List and Map for partition 6 are compared to the logical sector number at decision block 31. In this case, the logical sector number does not equal the entry in the Local Spare Sector List for partition 6 so proceed to step 32. At decision block 32, the entry in the Local Spare Sector List for partition 6 (00) is less than or equal to the logical sector (02) and the Bit Map entry for partition 6 is a logical "1." Therefore, proceed to step 34 and calculate the target sector by adding 1 to the target sector value calculated at step 28. Thus, the new target sector is sector 3.

At step 35, the Overflow Spare Sector List is compared to the logical block address. At decision block 36, the entry in the Overflow Spare Sector List for partition 6, (62) is equal to the logical block address (62). Therefore, proceed to step 37. At step 37, the target sector address is equal to the overflow spare sector address (found in field 5 of the zone table for zone 3). The overflow spare sector address is track E, sector 8. At step 38, seek to the target address, track E sector 8, and referring briefly to FIG. 5, see that logical block address 62 is in fact located at track E sector 8.

BLOCK DIAGRAM

Figure 7:
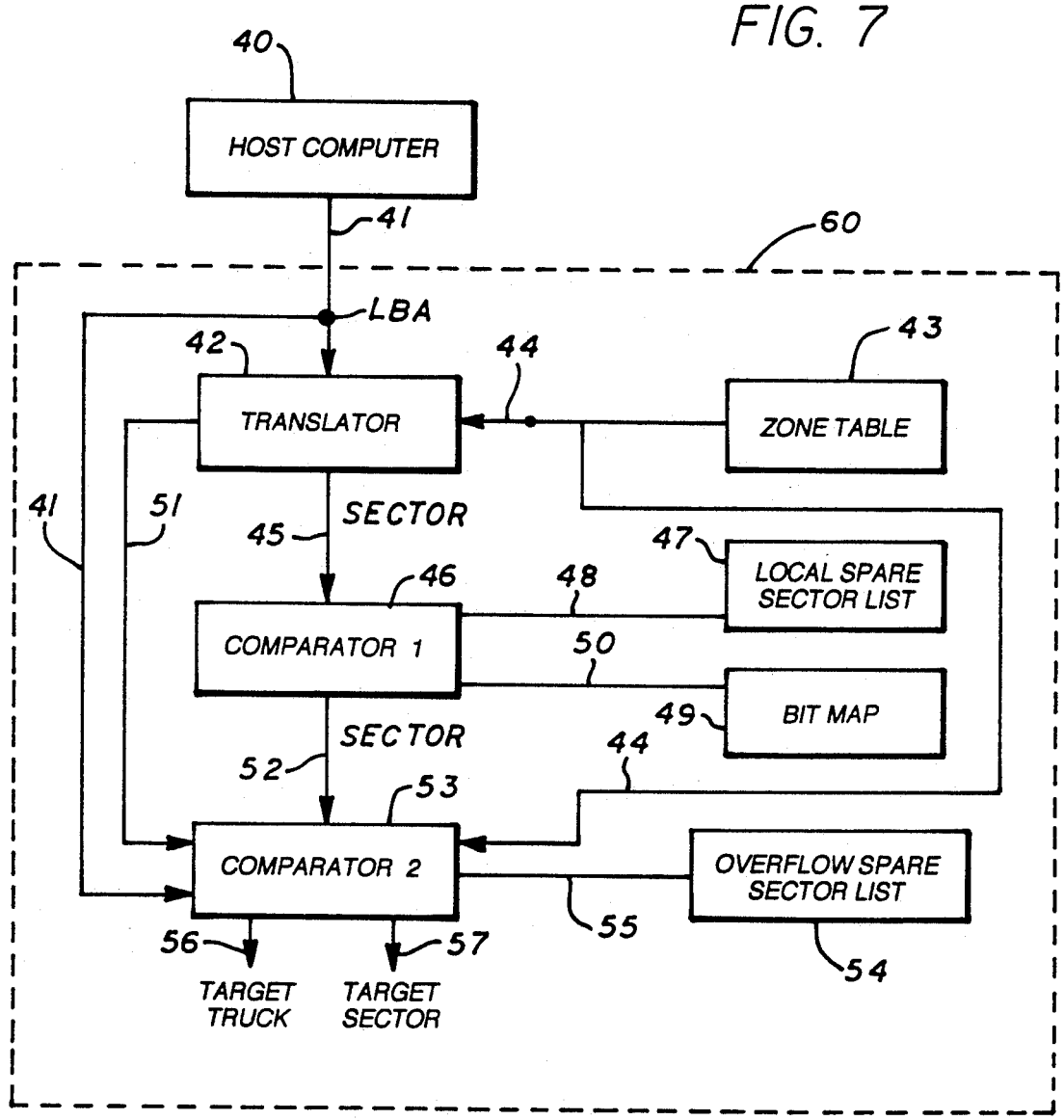
FIG. 7 is a block diagram of this invention.

A block diagram of one embodiment of the present invention is illustrated in FIG. 7. A host computer 40 provides a logical block address on line 41 to a disk drive, generally indicated by dashed line 60. The disk drive 60 is a magento-optical disk drive in the preferred embodiment of this invention. However, this invention is not limited to optical disk drives, but has equal application to any storage system where information is stored in blocks and where spare blocks are utilized to compensate for defects. The disk drive 60 is not shown in its entirety so as not to obscure the invention. However, the general structure of disk drives in which the present invention may be implemented is well known in the art. Examples of disk drives that may be used with this invention are magneto-optical disk drives manufactured by Maxtor and Canon. FIG. 7 illustrates apparatus to be used with a disk drive in implementing this invention.

Referring again to FIG. 7, the LBA is provided to translator 42. The translator 42 is coupled to zone table 43 on line 44. The translator compares the zone table entries to the logical block address to determine the appropriate zone and calculates a target track 51 and target sector 45 utilizing equations 1 and 2.

The target sector 45 calculated by the translator 42 is provided to a first comparator block 46. The first comparator block 46 is coupled to the Local Spare Sector List 47 and Bit Map 49 on lines 48 and 50, respectively. The first comparator block 46 compares the target sector 45 to the Local Spare Sector List and Bit Map to determine if sector slipping has been applied and adjustment of the target sector is required. The first comparator block 46 outputs a target sector 52 to a second comparator block 53. The translator 42 provides the target track 51 to the second comparator block 53. The LBA 41 is also coupled to the second comparator block. The second comparator block 53 is coupled to the zone table 43 and Overflow Spare Sector List 54 through lines 44 and 55, respectively. The second comparator block compares the logical block address 41 to the Overflow Spare Sector List entry for the appropriate partition. If an adjustment is required (through sector replacement), the zone table 43 is used to provide the appropriate target track and target sector number. Otherwise, the track generated by the translator 42 and the sector 52 provided by comparator 46 are selected. The second comparator block 53 outputs the target track 56 and target sector 57 to the disk drive seek circuitry (not shown). The translator and first and second comparator are implemented using a microprocessor in the preferred embodiment. The Zone Table, Local Spare Sector List, Bit Map and Overflow Spare Sector List are stored in memory, such as RAM.

The defect management scheme of the present invention reduces the memory requirement for storing defective sector information as compared to prior art schemes. For example, for a 500 megabyte magneto magneto optical drive with a one percent defect rate, the memory requirements are as follows:

Total number of partitions-approximately 4,000
Partition size = 128 logical sectors and 1 local spare sector
Number of overflow spare sectors per zone = 64
Number of zones = 18
Total number of overflow spare sectors: 18 × 64 = 1,152
Total number of spare sectors = 4,000 + 1,152 = 5,152 handles up to 1% defect.
Zone table size (18 zone × 11 bytes/zone) = 198 bytes
Local Spare Sector List (4,000 entries × 1 byte/entry) = 4,000 bytes
Bit Map = (4,000 partition/8 partitions per byte) = 500 bytes
Overflow Spare Sector Lists (1,152 × 3 bytes/entry) = 3,456 bytes
Total Table Size: 8,154 bytes This compares to the previously calculated 30,000 bytes required using the prior art defect management scheme.

ADDRESSING SCHEME

The example of FIGS. 3-5 illustrates the invention in connection with an 8-bit logical block addressing scheme. The addressing scheme of this invention is not restricted to such a logical block addressing scheme but may be utilized with any size LBA addressing scheme.

Regardless of the number of bits of the logical block address, this invention divides the address into two fields, with one field indicating a partition location and the other field indicating an offset pointer to a sector location. For example, consider the case where the logical block address is a 16-bit address. The 10 most significant bits can define the partition field and the six least significant bits can define the offset field. The partition field, having 10 bits, can be used to define up to 1024 partitions. The six bits of the offset field can define up to 64 sectors per partition.

An N bit LBA address is divided into the L Most Significant Bits (MSB) to represent partition number and M Less Significant Bits (LSB) to represent logical sector addresses within each partition. L and M may be equal but such is not required. Typically, there is no overlap of bits between the L and M bits.

If there are L bits available to represent partition numbers, $2^L$ partitions may be defined. Thus, for a 2 partition drive, there must be at least one most significant bit to represent partition number. For a 4 partition disk drive environment, at least 2 most significant bits are required.

Similarly, for a logical sector address of Mbits, $2^M$ logical sectors can be defined.

By remapping the drive into partitions instead of relying simply on tracks, the sector location can be determined simply by splitting the logical block address into a partition field and offset field. Thus, only sector information is needed in the lists used for defect management. In the prior art, both track and sector information must be stored in the primary defect list and secondary defect list. By eliminating the storage of track numbers, memory requirements are reduced.

This invention has been described in connection with a single layer media. However, the invention has equal application to multi-layer media wherein multiple read/write heads access the surfaces of a plurality of disks. For example, the logical block address could be further divided into a third field, which indicates the number of the read/write head being accessed. The remainder of the system of any one disk surface would be the same as described in the above examples. In addition, the invention is not limited to a 500 megabyte drive. Any size drive can be accommodated by changing the size of the fields in the logical block address and increasing the size of the fields in the Local Spare Sector List and Overflow Spare Sector List.

Thus, defect management scheme and disk media addressing scheme have been described.

I claim:

1. A method of addressing sectors in a storage system comprising the steps of:
   providing a logical block address (LBA) to said storage system, said LBA comprising N bits;
   determining a partition location of said LBA by reading L bits of said LBA, where L is less than N, said L bits defining said partition location of said storage system;
   determining a logical sector address location of said LBA by reading M bits of said LBA, where M is less than N, said M bits defining a logical sector number of said partition;
   determining a physical target address from said partition location and said logical sector address;
   comparing said physical target address to a primary defect list to generate an adjusted physical target address; and, comparing said adjusted physical target address to a secondary defect list to generate a final physical target address.

2. The method of claim 1 wherein said adjusted physical target address is generated by applying sector slipping when said physical target address is greater than or equal to the address of a defective sector in said primary defect list.

3. The method of claim 1 wherein said L bits are the most significant bits of said LBA and define $2^L$ partitions.

4. The method of claim 1 wherein said M bits are the least significant bits of said LBA and define $2^M$ logical sectors.

5. A method of providing defect management of a plurality of sectors on a storage media, said method comprising the steps of:
   dividing said media into a plurality of partitions, each of said partitions comprising a plurality of storage sectors and at least one local spare sector;
   dividing said partitions among a plurality of zones, each of said zones including a plurality of overflow spare sectors;
   assigning a logical block address (LBA) to each of said sectors and using said local spare sector for sector slipping in each partition having a primary defect;
   replacing each secondary defective sector in a partition with a local spare sector of that partition when available and replacing each secondary defective sector in a partition with an overflow spare sector when a local spare sector is not available;
   storing the status of each local spare sector in a local spare sector list;
   providing a bit map wherein each bit of said bit map corresponds to one of said local spare sectors and setting the value of a bit to a first logical value when the corresponding local spare sector is used for sector slipping; and,
   storing the status of each overflow spare sector in an overflow spare sector list.

6. The method of claim 5 wherein said local spare sector list comprises an entry for each of said local spare sectors, each entry for indicating when said local spare sector is available, when said local spare sector is not available and a logical sector number of a sector replaced with said local spare sector.

7. The method of claim 5 wherein said overflow spare sector list comprises an entry for each of said overflow spare sectors, each entry for indicating when said overflow spare sector is available, when said overflow spare sector is not available and a logical sector number of a sector replaced with said overflow spare sector.

8. The method of claim 5 wherein said LBA comprises N bits and a partition location of said LBA is determined by reading L bits of said LBA, where L is less than N, said L bits defining said partition location; and,
   determining a logical sector address location of said LBA by reading M bits of said LBA, where M is less than N, said M bits defining a logical sector number of said partition.

9. The method of claim 8 said L bits are the most significant bits of said LBA and define $2^L$ partitions.

10. The method of claim 8 wherein said M bits are the least significant bits of said LBA and define $2^M$ logical sectors.

11. A defect management apparatus comprising:
   a disk drive including a storage media, said storage media having a plurality of tracks, said storage media divided into a plurality of partitions each of said partitions comprising a plurality of storage sectors and at least one local spare sector, said partitions divided among a plurality of zones, each of said zones having a plurality of overflow spare sectors;
   translating means for receiving a logical block address (LBA) and for converting said LBA to a target physical address and providing said target physical address as a first output;
   first storage means for storing the status of each local spare sector in a local spare sector list;
   second storage means for storing a bit map wherein each bit of said bit map corresponds to one of said local spare sectors and setting the value of a bit to a first logical value when the corresponding local spare sector is used for sector slipping;
   third storage means for storing the status of each overflow spare sector in an overflow spare sector list;
   first comparing means coupled to said translating means and said first and second storage means for comparing said physical target address to an entry in said local spare sector list and said bit map and providing an adjusted physical target address when said physical target address is equal to an entry in said local spare sector list; and,
   second comparing means coupled to said first comparing means and third storage means for comparing said adjusted target physical address to an entry in said overflow spare sector list and generating a final target physical address based on said comparison.

12. The apparatus of claim 11 wherein said local spare sector list comprises an entry for each of said local spare sectors, each entry for indicating when said local spare sector is available, when said local spare sector is not available and a logical sector number of a sector replaced with said local spare sector.

13. The apparatus of claim 11 wherein said overflow spare sector list comprises an entry for each of said overflow spare sectors, each entry for indicating when said overflow spare sector is available, when said overflow spare sector is not available and a logical sector number of a sector replaced with said overflow spare sector.

14. A method of addressing sectors in a storage system comprising the steps of:
   providing a logical block address (LBA) to said storage system, said LBA comprising N bits;
   determining a partition location of said LBA by reading L bits of said LBA, where L is less than N, said L bits defining said partition location of said storage system;
   determining a logical sector address location of said LBA by reading M bits of said LBA, where M is less that N, said M bits defining a logical sector number of said partition;
   determining a physical target address from said partition location and said logical sector address;
   comparing said physical target address to a primary defect list to generate an adjusted physical target address; and,
   comparing said adjusted physical target address to a secondary defect list to generate a final physical target address.

15. The method of claim 14 wherein said adjusted physical target address is generated by applying sector slipping when said physical target address is greater than or equal to the address of a defective sector in said primary defect list.

* * * * *